Figure 3:
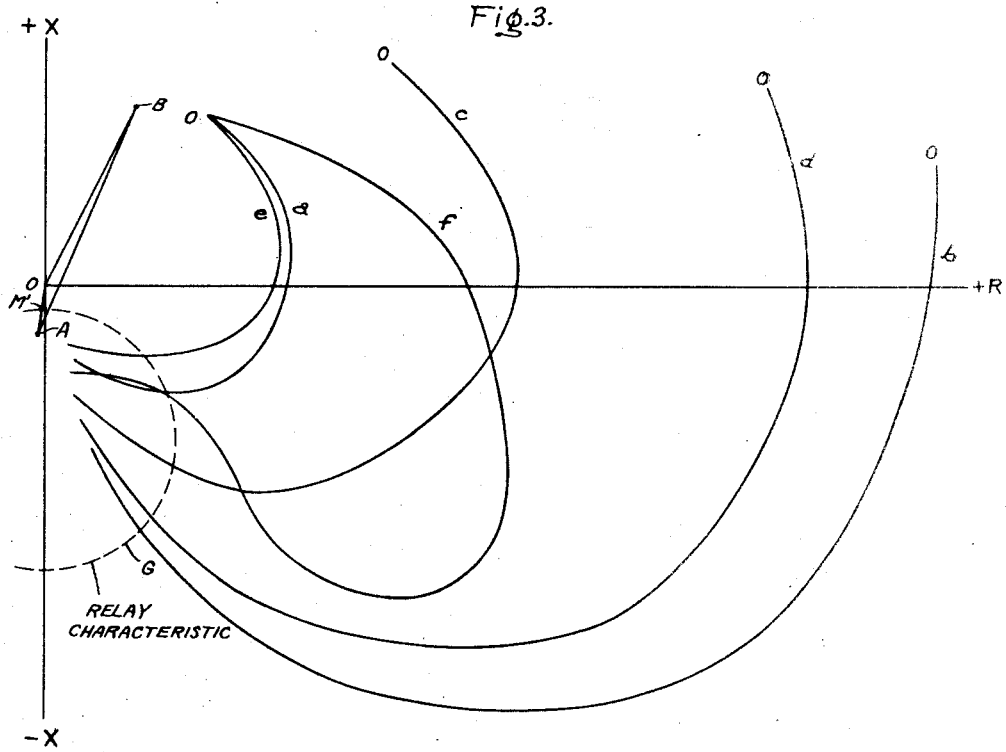

Sept. 26, 1950     C. R. MASON ET AL     2,523,771
LOSS OF EXCITATION PROTECTION
Filed June 1, 1949     2 Sheets-Sheet 1
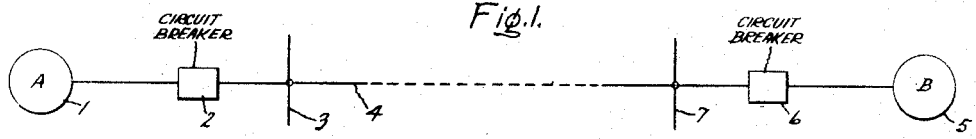
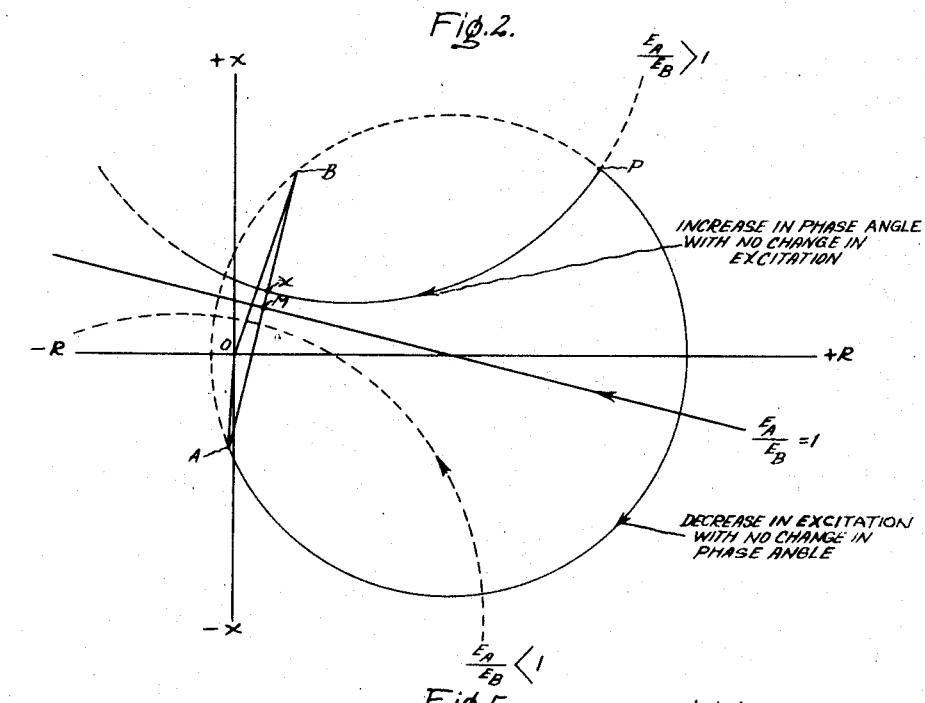
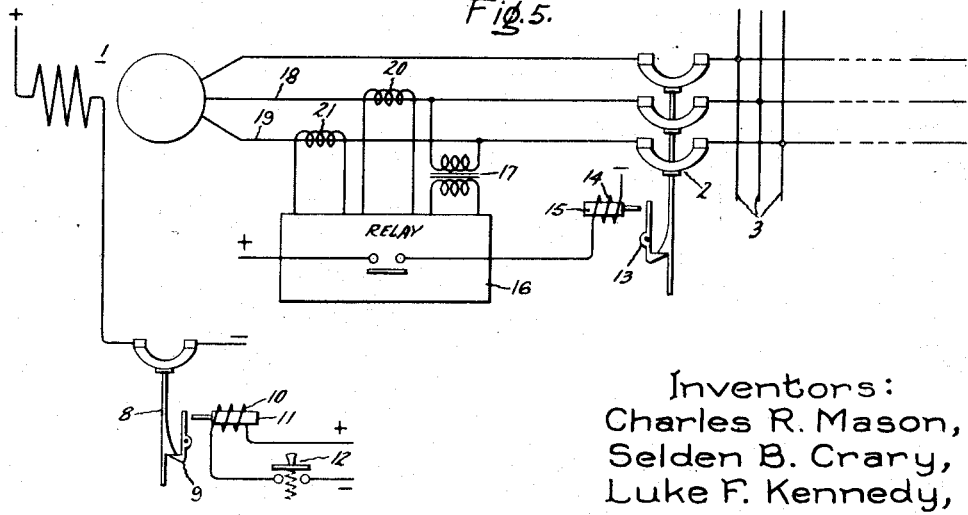
Inventors:
Charles R. Mason,
Selden B. Crary,
Luke F. Kennedy,
by Ernest H. Britton
Their Attorney.

Inventors:
Charles R. Mason,
Selden B. Crary,
Luke F. Kennedy,
by Ernest C. Britton
Their Attorney.

Patented Sept. 26, 1950

2,523,771

UNITED STATES PATENT OFFICE 2,523,771

LOSS OF EXCITATION PROTECTION

Charles R. Mason, Ballston Spa, and Selden B. Crary and Luke F. Kennedy, Schenectady, N. Y., assignors to General Electric Company, a corporation of New York Application June 1, 1949, Serial No. 96,586

7 Claims. (Cl. 175—294)

This invention relates to electric protective devices and more particularly to an improved relay arrangement for disconnecting a synchronous electric generator from its associated power system selectively in response to loss of or a substantial reduction in the field excitation of the generator.

An object of our invention is to provide means including an improved offset selective response impedance relay for protecting a synchronous generator against loss of excitation without causing undesired disconnection of the machine from its system during predetermined power swings as well as during predetermined out-of-step conditions.

Further objects and advantages of our invention will become apparent as the following description proceeds and the features of novelty which characterize our invention will be pointed out with particularity in the claims annexed to and forming a part of this specification.

In accordance with our invention, an improved offset selective response type of relay is provided and connected to be energized by an electrical quantity derived from the voltage between two conductors at the line terminals of the generator and by another electrical quantity derived from the currents in these two conductors. The construction of the improved relay may be similar to the construction of the line fault responsive starting unit disclosed in Patent 2,115,597—Traver, granted April 26, 1938, but is provided with improved offsetting means in a manner similar to the disclosure of Patent 2,405,081—Warrington, granted July 30, 1946, both of which patents are assigned to the assignee of this application. As in the above Warrington patent, the relay utilized in our invention is provided with a current responsive winding which is energized by an electrical quantity dependent upon the vector difference of the currents in two of the system conductors and a voltage responsive winding energized by an electrical quantity dependent upon the voltage between the same two conductors. The current responsive winding is arranged to produce an operating torque while the voltage responsive winding is arranged to produce a restraining torque tending to maintain the relay contacts open. The torque may be expressed as $$K'EI \cos(\theta+\phi) - K''E^2$$

where E and I are respectively the voltage and current of the system, $\phi$ is the power factor angle between E and I, which is considered to be positive when the current lags the voltage and negative when the current leads the voltage, $\theta$ is the phase angle of the relay characteristic which would be a constant positive value substantially equal to 90°, and K' and K'' are constants which account for top settings, contact biasing means such as gravity or spring means and other factors. In the above expression net positive torque is here considered as being effective to close the relay contacts while net negative torque would be effective to open the contacts. Such relays, as is well known, have an impedance characteristic, which when represented on a resistance-reactance diagram, is circular in shape. This general type of relay is known as a mho relay and according to our invention, the relay is so constructed that its characteristic when represented on a resistance reactance diagram for the system will selectively encompass only the possible impedance conditions of the system which occur when the particular generator protected by our invention loses its field excitation.

Figure 4:
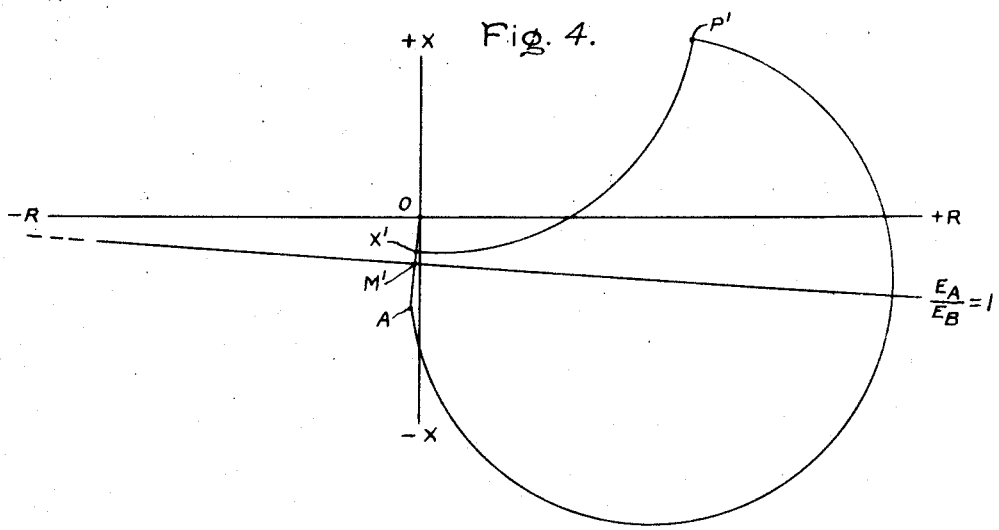

For a better understanding of our invention, reference may be had to the accompanying drawing in which Fig. 1 is a one line diagram representing a generator supplying a power system; Fig. 2 is a combined generator and line impedance diagram to aid in understanding some of the principles involved in our invention; Fig. 3 is a family of curves representing the impedance conditions of a system when a loss of generator excitation occurs; Fig. 4 is an impedance diagram representative of conditions existing when the system impedance excluding the protected generator is zero; and in which Fig. 5 is a schematic diagram showing the application of our invention to a generator.

With reference to Fig. 1, a generator 1 is shown connected through the circuit breaker 2 to the bus 3 which in turn is connected to transmission line 4. A portion of line 4 is shown dotted to indicate a longer length of line than is shown. The remaining generation connected to the system is represented by the generator 5 which is connected through the circuit breaker 6 to the bus 7 which in turn is connected with the transmission line 4.

With reference to Fig. 2, we have shown an impedance diagram on which the line AB is representative of the total impedance of the system shown in the one line diagram of Fig. 1. In Fig. 2, the line OB represents the impedance of the system shown in Fig. 1 from the terminals of generator 1 through the line 4 and including the impedance of the generator 5. In Fig. 2, the point A represents the direct axis transient impedance of the generator 1. The relay embodied in our invention is shown connected to the power system near the terminals of generator 1 and therefore insofar as the impedance diagram of Fig. 2 is concerned, the relay is located adjacent the terminal point O, the preferred location of the improved offset selective operating range of the relay being shown clearly by the dash line circle G of Fig. 3.

The curves $a$—$f$ of Fig. 3 such as might be obtained by means of a differential analyzer study, represent certain system impedance conditions when a loss of excitation occurs in one generator such as generator 1. In these curves, the impedances for several normal conditions occupy initial positions in the upper right hand quadrant at points represented by "O" to indicate zero time. After excitation is lost, the impedance moves relatively slowly toward the area enclosed by the dotted line circle G that represents the offset operating response range of the improved selective impedance relay of the present invention, except in the case of curve $f$ which represents an open field circuit for the generator for which condition the impedance moves relatively fast along the curve toward the circle G. Curves $a$—$e$ except curve $f$ represent a short circuited field. Thus, a mho relay having the particular kind of characteristic such as is indicated by the dotted line circle G of Fig. 3 inherently will operate in accordance with our invention to selectively cause disconnection of generator 1 from the system to protect against loss of generator excitation without causing undesired disconnection of the generator during power swings or during out-of-step conditions such as indicated in Fig. 2. For practical purposes, it may be assumed that these curves terminate within the dotted circle since the mho relay operates almost instantly once its characteristic is crossed by the system impedance.

Three loss-of-synchronism characteristics due to power swings or out-of-step conditions are shown in Fig. 2 for three different conditions of generated voltage $E_A$ back of transient reactance of generator 1 relative to the voltage $E_B$ of generator 5 back of the system. These three curves are actually arcs of circles centered on extensions of the straight line AB. The curve for $$\frac{E_A}{E_B}=1$$

is a straight line, i. e., a circle of infinite radius, and is the perpendicular bisector of the straight line AB. There is an infinite number of such curves for all possible values of $$\frac{E_A}{E_B}$$

For values of $$\frac{E_A}{E_B}$$

progressively greater than unity, the circles become smaller, their centers move in toward B and finally the circles shrink to the point B. Similarly, for values of $$\frac{E_A}{E_B}$$

progressively smaller than unity, the circles become smaller, their centers move in toward A, and finally the circles shrink to the point A.

The arc PA of Fig. 2 is part of a circle, the rest of which is shown dotted, which passes through A, B, and P, and whose center is on the $$\frac{E_A}{E_B}=1$$

line. This is the circle for a certain phase angle between the generator 1 and the equivalent generator 5, with generator 1 leading generator 5. There is an infinite number of such circles for all possible angular relations between the generators, and all of these circles pass through A and B. As the phase angle increases, the diameter of the circle decreases until its center is at M and its diameter is AB. At this point, generator 1 is 90° ahead of generator 5. Further advance in phase angle is represented by circles of increasing diameter with their centers farther and farther to the left of M.

As indicated on Fig. 2, starting from an initial point P, the impedance vector will trace curve PX for an increase in phase angle with no change in excitation, and curve PA for a decrease in excitation with no change in phase angle. Since loss-of-excitation involves both types of change simultaneously, it follows that the actual curve such as the curves of Fig. 3 will lie between the boundary arcs PX and PA. For rapid decrease in excitation with relatively little advance in angle, as for an open-circuited generator field under light-load conditions as represented by curve $f$ of Fig. 3, the characteristic lies close to the arc PA. But for a short-circuited field having a long time constant such as is represented by curve $e$ of Fig. 3, the characteristic lies farther away from PA.

In Fig. 4, the system impedance OB of Figs. 2 and 3 is reduced to zero while the impedance AO of generator 1 is unchanged so as to represent an imaginary system of infinitely small impedance relative to the machine impedance. The loss of synchronism characteristic for the condition when $E_A=E_B$ is still the perpendicular bisector of the total impedance represented in Fig. 4 by line AO. If excitation is not lost or appreciably reduced, and assuming the voltage $E_A$ will be larger than the voltage $E_B$, a power swing due principally to an increase in phase angle between generator 1 and generator 5 will follow a curve close to curve P'X' of Fig. 4, and hence would intersect the line AO of Fig. 4 at some point between point O and point M'. If excitation of generator 1 is lost, the impedance would follow a curve similar to curve P'A of Fig. 4 or some curve such as the curves $a$—$f$ of Fig. 3 and hence would not intersect the line AO of Fig. 4 between point M' and point O. Since the line AO, being representative of the direct axis transient impedance of the generator, approximates the direct axis transient reactance of generator 1 and since point M' is the midpoint of line AO, the relay characteristic should be offset from the origin in the negative direction along the X-axis by a distance equal to at least one-half the direct axis transient reactance of generator 1. Where used herein, the word "offset" means that the characteristic circle of the relay does not include the origin of the resistance-reactance diagram and the offset distance OM' of Fig. 4 prevents operation of the relay for impedance such as curve P'X' of Fig. 4 which do not involve loss of excitation by the protected generator.

As explained in an article by A. R. van C. Warrington appearing in volume 65 of the 1946 Transactions of the American Institute of Electrical Engineers at pages 378 to 385, the mho relay characteristic may be offset by adding to the quantity derived from line potential a biasing potential proportional to the line current. This biasing potential in accordance with our invention would be utilized by known principles to move the mho relay characteristic circle bodily so that it would be offset from the origin by the distance OM' as shown by the dash line circle G in Fig. 3. Ordinarily the phase angle of the relay would be such that the center of the mho relay circle G of Fig. 3 would lie along the negative portion of the X-axis as shown in Fig. 3. It will be understood that if the center of the improved offset selective response impedance characteristic circle G were somewhat to one side or the other of the X-axis, the results to be accomplished would be substantially the same. Thus, if slight changes in the angle θ were made the amount of the offset distance would not be appreciably affected.

In Fig. 5, the generator 1 is shown with its field controlled by a circuit breaker 8 having a latching mechanim 9. Latch 9 is operated by the solenoid 10 and its armature plunger 11. Energization of solenoid 10 may be accomplished in any suitable manner such as by the manual switch 12. The force of gravity will open the circuit breaker 8 when latch 9 is operated. The field circuit breaker may be closed by suitable manual means. The armature circuit of generator 1 is controlled by circuit breaker 2, the latch 13 being controlled by the solenoid 14 and its associated armature 15. The tripping circuit including solenoid 14 is under the control of schematically represented relay 16. Relay 16 is of the mho type and the circular characteristic of the relay is offset from the origin and may be represented by the circle G of Fig. 3 as already explained. Relay 16 is energized by line to line voltage through the potential transformer 17 connected across any two conductors such as 18 and 19. Phase current is supplied from lines 18 and 19 to relay 16 by means of the current transformers 20 and 21. If generator 1 loses its excitation, the impedance of the system will fall within the circle G of Fig. 3 and the relay 16 will close its contacts and thereby trip circuit breaker 2.

Particular conditions may warrant the assumption that a loss of excitation in the field of generator 1 for any reason would not be accompanied by a short circuit on the system, in which case only one relay such as 16 need be used. It may be desirable, however, to use a separate relay for each phase of the system.

Thus, in accordance with our invention, it is possible to provide loss-of-excitation protection for a synchronous generator by means of an offset mho relay. Because of the offset characteristic of the relay, undesired tripping during predetermined power swings as well as during predetermined out-of-step conditions is avoided and disconnection of the generator from the system is accomplished before the generator slips the first pole when the generator loses its field excitation for any reason.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. A device for effecting the disconnnection of a synchronous machine from an alternating current power system in response to a predetermined reduction of the field excitation of the machine comprising an offset selective response impedance relay whose operating impedance characteristic when represented on a resistance reactance diagram for the machine and system includes only that half of the machine impedance characteristic which is farthest from the point thereof corresponding to the machine terminals.

2. A device for effecting the disconnection of a synchronous machine from an alternating current power system in response to a predetermined reduction of the field excitation of the machine comprising an offset selective response impedance relay whose operating impedance characteristic when represented on a resistance reactance diagram for the machine and system intersects the machine impedance characteristic so that the operating characteristic includes only a portion of the machine characteristic which is remote from the point corresponding to the machine terminals.

3. A device for effecting the disconnection of a synchronous machine from an alternating current power system in response to a predetermined reduction of the field excitation of the machine comprising an offset selective response impedance relay having an operating impedance characteristic which when represented on a resistance reactance diagram for the machine and system intersects the machine impedance characteristic so that the operating characteristic includes the portion of the machine characteristic between the point thereon corresponding to direct axis transient impedance of the machine and another predetermined point thereon located between the point corresponding to the direct axis transient impedance of the machine and the point corresponding to the terminals of the machine.

4. An arrangement for disconnecting a synchronous generator from its associated system when the generator loses its field excitation comprising means for deriving from the system an electrical quantity dependent upon the vector difference of the currents in two of the system conductors, means for deriving from the system an electrical quantity dependent upon the terminal voltage of the generator between said two conductors, and generator disconnecting means including an offset selective response impedance relay energized by said derived quantities and having an impedance characteristic which when represented on a resistance-reactance diagram for the system and generator intersects the generator impedance characteristic and which is circular in shape and offset from the origin by a quantity substantially equal to one-half the direct axis transient reactance of the associated generator for causing disconnection of the generator from the system when the generator loses its field excitation.

5. A protective arrangement for disconnecting a synchronous generator from its associated system comprising means for deriving from the system an electrical quantity dependent upon the vector difference of the currents in two of the system conductors, means for deriving from the system at the terminals of the generator an elecrical quantity dependent upon the voltage between said two conductors, and generator disconnecting means including an offset selective response impedance relay energized by said derived quantities and having an impedance characteristic which when represented on a resistance-reactance diagram for the system and generator is circular in shape and which is offset from the origin along the negative portion of the X-axis by a predetermined reactance quantity for causing disconnection of the associated generator in response to predetermined impedance conditions of the system which are representative of predetermined excitation conditions of the generator.

6. A protective arrangement for disconnecting a synchronous generator from its associated system comprising means for deriving from the system an electrical quantity dependent upon the vector difference of the currents in two of the system conductors, means for deriving from the system an electrical quantity dependent upon the voltage between said two conductors, and generator disconnecting means including an offset selective response impedance relay energized by said derived quantities and having an impedance characteristic which when represented on a resistance-reactance diagram for the system and generator is circular in shape and which is offset from the origin by a predetermined impedance quantity for causing disconnection of the associated generator from the system in response to a predetermined reduction in the excitation of the generator, said relay having a predetermined phase angle such that the center of the circle substantially coincides with a predetermined portion of the X-axis.

7. A protective arrangement for disconnecting a synchronous generator from its associated system comprising means for deriving from the system an electrical quantity dependent upon the vector difference of the currents in two of the system conductors, means for deriving from the system at the terminals of the generator an electrical quantity dependent upon the voltage between said two conductors, and generator disconnecting means including an offset selective response mho relay energized by said derived quantities and having an impedance characteristic which when represented on a resistance-reactance diagram for the system is circular in shape and which is offset from the origin by a quantity substantially one-half of the direct axis transient reactance of the protected generator in a direction along the negative portion of the X-axis and which has a phase angle such that the center of the circle substantially coincides with the negative portion of the X-axis, said relay being operable in response to an impedance condition representative of a loss of excitation of the associated generator to cause disconnection thereof from the system.

CHARLES R. MASON.
SELDEN B. CRARY.
LUKE F. KENNEDY.

REFERENCES CITED

The following references are of record in the file of this patent:

UNITED STATES PATENTS

| Number | Name | Date |
|---|---|---|
| 2,115,597 | Traver | Apr. 26, 1938 |
| 2,393,983 | Goldsborough | Feb. 5, 1946 |
| 2,405,081 | Warrington | July 30, 1946 |